US009940327B2

(12) United States Patent
Sato et al.

(10) Patent No.: US 9,940,327 B2
(45) Date of Patent: Apr. 10, 2018

(54) METHOD FOR GENERATING WORKFLOW FROM BUSINESS SPECIFICATION

(75) Inventors: Naoto Sato, Kanagawa-ken (JP); Michiaki Tatsubori, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 593 days.

(21) Appl. No.: 14/351,174

(22) PCT Filed: Jul. 31, 2012

(86) PCT No.: PCT/JP2012/069510
§ 371 (c)(1),
(2), (4) Date: Apr. 11, 2014

(87) PCT Pub. No.: WO2013/054581
PCT Pub. Date: Apr. 18, 2013

(65) Prior Publication Data
US 2014/0250146 A1 Sep. 4, 2014

(30) Foreign Application Priority Data

Oct. 12, 2011 (JP) .................................. 2011-225181

(51) Int. Cl.
*G06F 17/30* (2006.01)
*G06Q 10/06* (2012.01)

(52) U.S. Cl.
CPC ....... *G06F 17/30011* (2013.01); *G06Q 10/06* (2013.01); *G06Q 10/0633* (2013.01)

(58) Field of Classification Search
CPC .......... G06F 17/30011; G06Q 10/0633; G06Q 10/06
See application file for complete search history.

(56) References Cited

U.S. PATENT DOCUMENTS 8,037,449 B2 * 10/2011 Iborra ....................... G06F 8/30
717/105
8,656,364 B1 * 2/2014 Kolawa ..................... G06F 8/74
717/126
(Continued)

FOREIGN PATENT DOCUMENTS

CN    1841421 A    10/2006
CN    1870028 A    11/2006
(Continued)

OTHER PUBLICATIONS

Lee, Aximos of Web Architecture, 2009, pp. 1-8.*
(Continued)

*Primary Examiner* — Albert Phillips, III
(74) *Attorney, Agent, or Firm* — Intelletek Law Group, PLLC; Gabriel Daniel, Esq.

(57) ABSTRACT

To enable visual verification of the suitability of work items that has been recorded, with an application created in accordance with a document centric architecture. The present invention includes: extracting, from a design, a document state that will become a trigger for work activity start and a document state for the result, and, based on matching the triggers and results, diagramming through automatically structuring a flow for the plurality of activities. Specifically, design documents are analyzed and implementations for each activity support system, and extracted the collection of documents that have become the conditions for document states that will become triggers for work start, as well as the document states that will remain as work results.

15 Claims, 12 Drawing Sheets

(56) References Cited

U.S. PATENT DOCUMENTS

| | | | |
|---|---|---|---|
| 2003/0083910 A1* | 5/2003 | Sayal | G06Q 10/10 |
| | | | 717/102 |
| 2005/0044499 A1* | 2/2005 | Allen | G06F 17/30038 |
| | | | 715/704 |
| 2007/0179776 A1* | 8/2007 | Segond | G06F 17/2247 |
| | | | 704/9 |
| 2008/0154685 A1 | 6/2008 | Matsuda | |

FOREIGN PATENT DOCUMENTS

| | | |
|---|---|---|
| JP | 2002-288396 A | 10/2002 |
| JP | 2007-044358 A | 2/2007 |
| JP | 2008-158632 A | 7/2008 |
| JP | 2009-016383 A | 1/2009 |

OTHER PUBLICATIONS

Feng Yanan, "The Research of Office Automation System Based on Lotus Domino/Notes", Master's Thesis Xi'ian University of Architecture and Technology, 2007, 1 page.

Nagashima"Development of a New Word Processing Architecture for the Central Government Ministries and Agencies/ the Municipality which enables Correspondence." Prov.2007 n. 55, 2 pages.

* cited by examiner

METHOD FOR GENERATING WORKFLOW FROM BUSINESS SPECIFICATION

CROSS REFERENCE TO RELATED APPLICATIONS

This application claims priority under 35 U.S.C. 371 from PCT Application, PCT/JP2012/069510, filed on Jul. 31, 2012, which claims priority from the Japanese Patent Application No. 2011-225181, filed on Oct. 12, 2011. The entire contents of both applications are incorporated herein by reference.

BACKGROUND OF THE INVENTION

Field of the Invention

This invention relates to methods, programs and systems that create a workflow from a work specification that is saved in a computer readable format.

Description of Related Art

In the field of computer applications for business, there has recently been proposed a document centered architecture (document centric architecture), which is gradually being adopted. For example, there are available articles such as http:www-06.ibm.com/ibm/jp/provision/no55/pdf/55_sec_public.pdf.

With a document centric architecture, most work is started while considering a document or text material a trigger, the documents needed for work are collected, and the process is completed by creating another document. In this case, the documents handled by the work include information needed for executing the work. When following a document centric architecture, the system is constructed based on documents and jobs, with a single job forming a work unit that creates a single document or a plurality of documents in one occurrence.

Stated differently, a document centric architecture is an architecture in which a single activity for a work operation is concluded, from the reference of documents to the creation and revision of documents, within a document repository. An advantage is that it is easy to develop a system modularized for each work operation activity.

However, a document centric architecture has problems in that it is difficult to understand the linkage between designed work activity support systems, and in that connections to the work cannot be verified.

Relative to such problems, there exists the following former technology.

Japan Unexamined Patent Application Publication H07-44358, discloses a manufacturing support system of software that creates programs based on a data flow diagram, system flow design diagram, screen transition diagram, and screen form diagram, all of which are presented on a display. Based on the flow of data between the system flow design diagram and each type of diagram, it forms a structure by establishing an input-output relationship component for creating and registering access relationships for input-output and reference processing required during deployment of program components, an item transition definition component for registering transition conditions for each item by use of the definitions in the screen form diagram, an item dictionary definition component for registering such as input-output check procedures and creation procedures for each item by use of the definitions in the screen form diagram, and a component registration component for registering deployment procedures to the program components by use of the definitions in the component deployment definition screen.

Japan Unexamined Patent Application Publication H09-16383 discloses a process in which, in response to selection of screen transition display function, a screen transition data creation processing component is started by a main system component, screen transition data for the applications is based on screen data and processing flow data created and saved by a screen data creation processing component and a processing flow data creation processing component, and the screen transition condition is output and displayed on a display device in accordance with the screen transition data.

Japan Unexamined Patent Application Publication 2008-158632 discloses a process in which display of screen transition is controlled, by a controller, in accordance with definition information for flow, in order to link an image creation device with the workflow of server device.

Because they presume the existence of workflow, Japan Unexamined Patent Application Publication H07-44358 and Unexamined Patent Application Publication 2008-158632 do not align with a document centric architecture that does not maintain such a flow in advance.

Japan Unexamined Patent Application Publication H09-16383 discloses the creation of flow from a screen transition display function, but it is technology that makes connections between screens by presenting a description for the transition target screen in the program processing flow, and this is not sufficient for use within a document centric architecture.

SUMMARY OF THE INVENTION

Technical Problems

Accordingly, the purpose of this invention is to enable viewable verification of the suitability of described work, in an application created in accordance with a document centric architecture.

Solution to Problems

This invention solves the above described problem by extracting, from a design document saved in a computer readable format, a document state that will become a trigger for work activity start and a document state for the result, and, based on matching the triggers and results, by diagramming through automatically structuring a flow for the plurality of activities.

Specifically, a system that follows this invention analyzes the design document and implementation for each activity support system, and it extracts the collection of documents that have become the conditions for document states that will become triggers for work start, as well as the document states that will remain as work results. In one specific example, this is a design document for screen transition and the related logic, for which analysis is performed using semi-structured analytical extraction technology and natural language processing.

With a design document for screen transition and the related logic, a system that follows this invention extracts the component creating the document, and records it as an activity result for the activity corresponding to the screen transition.

In addition, with a design document for screen transition and the related logic, a system that follows this invention extracts the component for document query, and records it as an activity trigger for the activity corresponding to the screen transition.

Furthermore, a system that follows this invention creates a graph of the flow, with an activity as a node, an activity result as the link origin and an activity trigger as the link terminus. This graph is preferably presented on a display. By observing this flow, the user is able to check the suitability of the design specification.

Effect of the Invention

By use of this invention, as described above, because there is ability to create a workflow based on a design document that has been created in accordance with a document centric architecture, there is ability to test based on overall workflow, and ability to verify the suitability of the design document by review of the workflow.

DETAILED DESCRIPTION OF THE PREFERRED EMBODIMENTS

Mode for Implementing the Invention

The following section describes an embodiment of this invention based on the drawings. To the extent not specifically relinquished, identical reference symbols apply throughout all of the drawings and indicate identical objects. Furthermore, the following explanations relate to a single implementation mode of this invention, and there is sought understanding that there is no intent to limit this invention to the content described by the embodiment.

Figure 1:
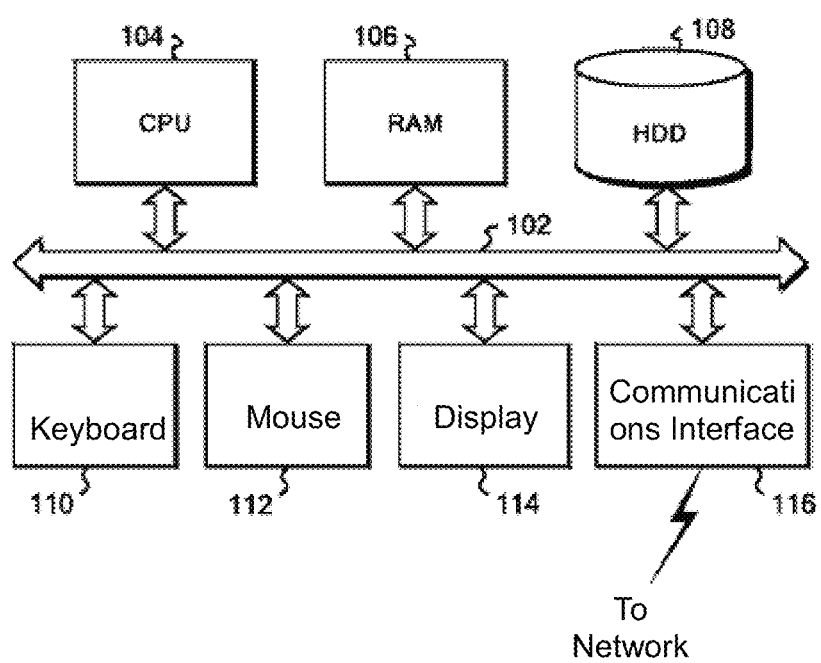
FIG. 1 is a block diagram of the hardware configuration for executing this invention.

When referring to FIG. 1, there is shown a block diagram of the computer hardware for producing the system structure and processing according to the embodiment of this invention. In FIG. 1, to system bus 102 there is connected CPU 104, main memory (RAM) 106, hard disk drive (HDD) 108, keyboard 110, mouse 112, and display 114. CPU 104 is preferably based upon a 32-bit or 64-bit architecture, and there can be used, for example, an Intel Pentium (trademark) 4, Core (trademark) 2 Duo, Xeon (trademark), or an AMD Athlon (trademark). Main memory 106 preferably has a capacity of 4 GB or more. Hard disk drive 108 preferably has a capacity of 500 GB or more.

Within hard disk drive 108 there is stored in advance an operating system, not shown individually in the diagram. The operating system can be discretionarily chosen for compatibility with CPU 104, from among such as Linux (trademark), Microsoft Windows (trademark) 7, Windows XP (trademark), or the Mac OS (trademark) of Apple Computer.

Within hard disk drive 108 there is also stored, as will be described hereafter in relation to FIG. 2, design document file 210, design document analysis module 222, screen transition analysis module 224, screen analysis module 226, workflow diagram creation module 232, activity box creation module 234, transition arrow creation module 236, and visualization module 240. These modules can be created with an existing programming language processing system such as C, C++, C#, or Java®, and they can be executed by the operating system loading these modules to main memory device 106 as needed. The details of the operation of these modules is explained in detail hereafter by referencing the function block diagram of FIG. 2.

Keyboard 110 and mouse 112 are operated by a prescribed GUI screen (not shown in drawing), and are used by starting such as one of the above described modules or by inputting characters.

Display 114 is preferably a liquid crystal display, and for example, there can be used a display with a discretionary resolution of XGA (1024×768) or UXGA (1600×1200). Display 114 is used to display the workflow of the created results.

The system of FIG. 1 is also connected to an external network such as a LAN or WAN through communications interface 116 that is connected to bus 102. Communications interface 116 is structured by such as Ethernet (trademark) and it exchanges data with a system such as a server on an external network or a client computer.

A system with a document centric architecture accesses a centrally controlled data memory system, and it is based on a software architecture that has been licensed for a plurality of computer systems that do not perform direct reciprocal exchange, but the system of this invention is a system for analyzing specifications of the document centric architecture and for making viewable the flow, and therefore a system with a document centric architecture is not necessary.

Specifically, the system of this invention can be mounted on a computer device of a discretionary mode, such as a personal computer, a workstation, or a mainframe. In addition, in FIG. 1, there is displayed a mode being connected to a network, but there is no limitation to this, and it can be used in a standalone mode.

Figure 2:
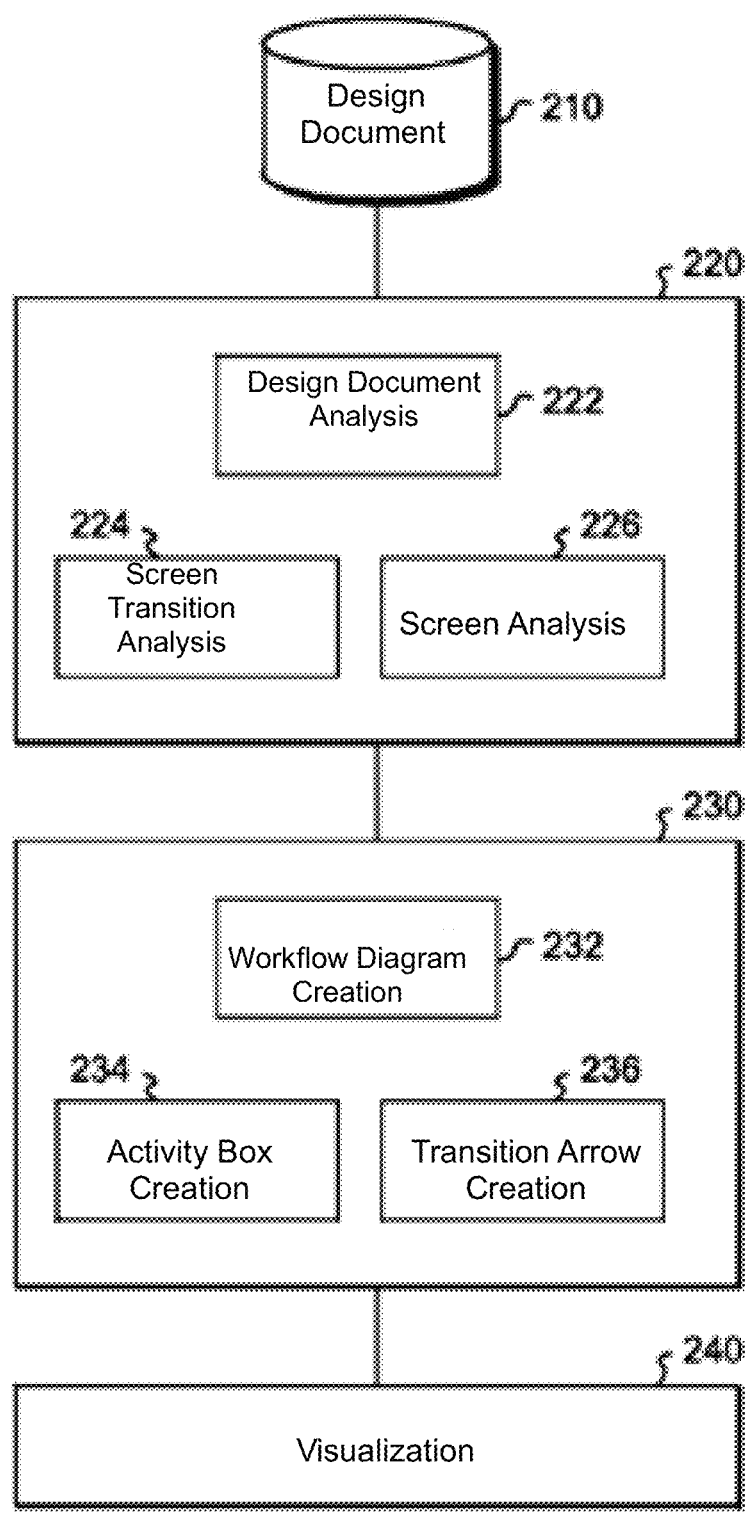
FIG. 2 is a block diagram of the functional structure for executing this invention.
Figure 3:
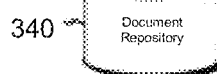
FIG. 3 is a chart that shows the structural elements of a design document.

FIG. 2 is a function block diagram that shows the logic structure for executing this invention. In FIG. 2, file 210 of a design document is stored in a computer readable form on hard disk drive 108, and, more specifically, it comprises, as shown in FIG. 3, screen transition drawing component 310, screen design component 320, and logic design component 330. Preferably these will be created and used by a spreadsheet program such as Excel®, offered by the Microsoft company, although there is no limitation to this.

Figure 4:
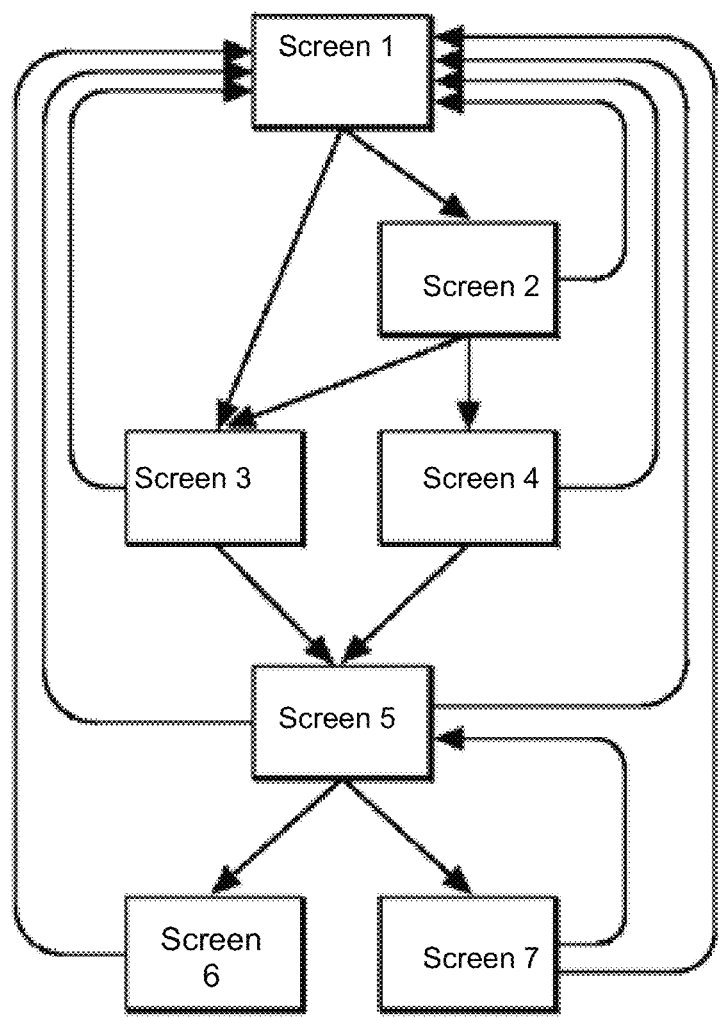
FIG. 4 is a diagram that shows an example of screen transition.

Screen transition drawing component 310 specifies a correspondence between an identifier for a transition origination screen and an identifier for a transition destination screen, as shown in the drawing, and these are used to describe screen transition, for example, as shown in FIG. 4.

Within screen design component 320 there is held a description that specifies a screen item and a reference logic identifier, for each screen identifier specified by screen transition drawing component 310.

Logic design component 330 includes a description of the logic for a document query and the logic for document creation in the column for document repository access for each reference logic identifier specified by the screen design component 320.

Document repository 340 is not a part of design document 210, but at this point it is displayed as an item related to logic design component 330.

Document repository 340 is a repository that holds a plurality of documents, and it is a target for creating queries and creating documents which are created by the applications in accordance with design document 210. Document repository 340 is typically an XML database, and, although not shown in FIG. 3, the XML database generates, from the design document of a document, the schema for the document. Queries, as well as the creation and modification of a document, are mounted in accordance with this document schema.

Figure 5:
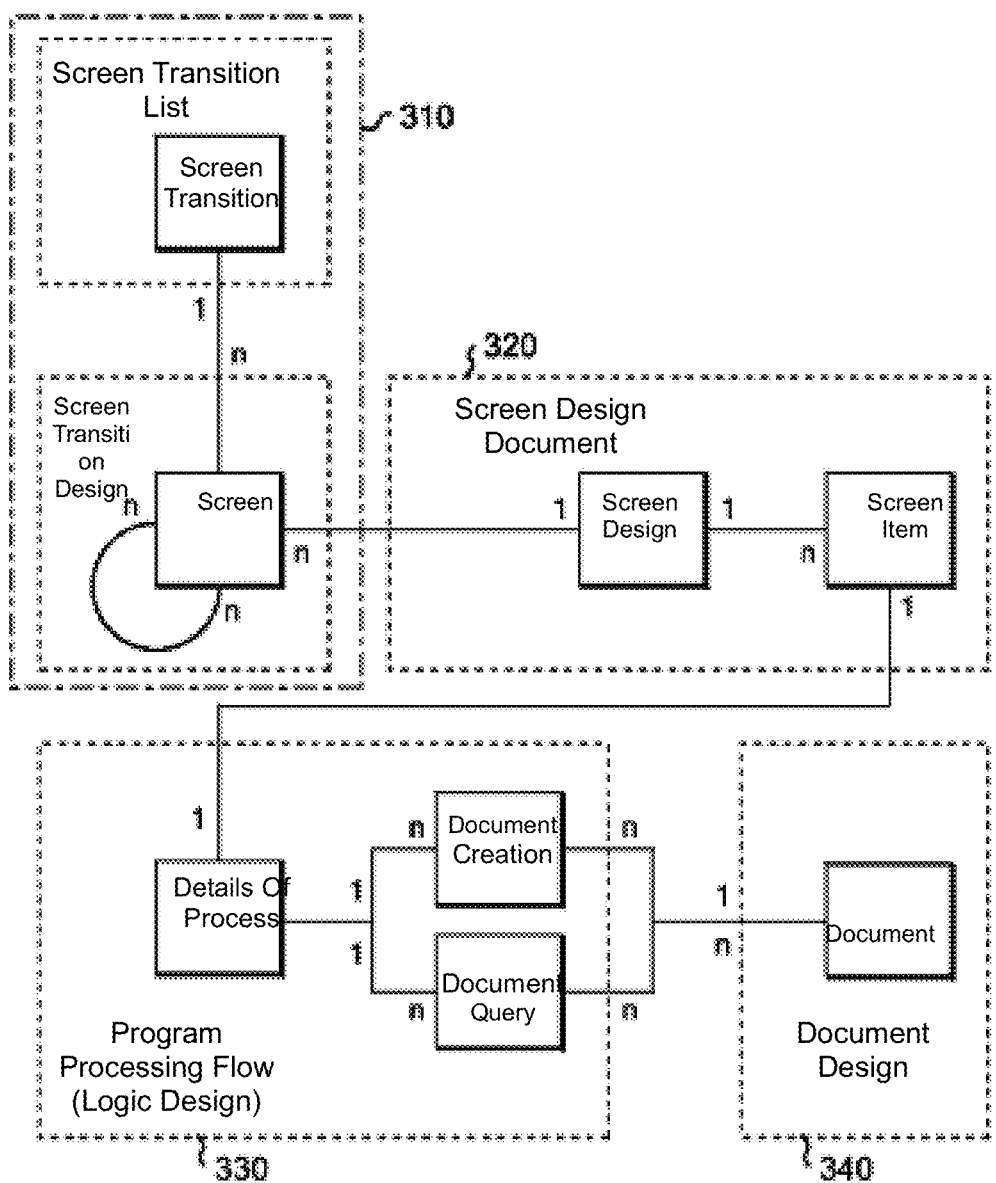
FIG. 5 is a diagram that shows linking of a typical design document.

FIG. 5 is a diagram that shows an example of related documents that are main elements of the design document shown in FIG. 3.

The following items are recorded in the document repository access column, and they present an example of a document query. A document query is generally recorded in a logical expression (the following items a~e, for example) that shows the conditions for a document. In addition, specific content is actually entered within following target document types 1, 2, 3 and conditions 1, 2. Here, it is acceptable to use "&" for "and" as well as "|" for "or".
a and (b or c) and d and e
a. Target document 1 exists in a folder
b. The number of target document 1 meets a prescribed condition
c. There is a document that meets the following conditions
   Condition 1
   Condition 2
d. Target document 2 does not exist in a folder
e. Target document 3 does not exist in a folder The following items are recorded in the document repository access column, and they present an example of document creation. Document creation is generally recorded in a simple form (the following c, for example) to show the conditions or content of the document.
c
c. Create a document that meets the following conditions
   Condition 1
   Condition 2

In this way, within the document repository access column, there is generally included a description with a logical expression and with natural language.

Returning to FIG. 2, block 220 is a collection of modules that have functions for analyzing design document 210, and it comprises design document analysis module 222, screen transition analysis module 224, and screen analysis module 226. Block 220 processing details are explained hereafter by referencing the flow charts of FIG. 6~8.

Block 230 is a collection of modules that have functions for creating a workflow diagram based on the data of the design document analysis result created by block 220, and it comprises workflow diagram creation module 232, activity box creation module 234, and transition arrow creation module 236. Block 230 processing details are explained hereafter by referencing the flow charts of FIG. 9~11.

Visualization module 240 has functions for making the workflow viewable and displaying it in display 114, based on information, preferably in the XML format, for the workflow diagram created by block 230. Visualization module 240 is preferably the WebSphere® Business Modeler, offered by International Business Machines Corporation, although the module is not limited to this.

The following section describes the processing of this invention by referencing the flow charts of FIG. 6~11.

Figure 6:
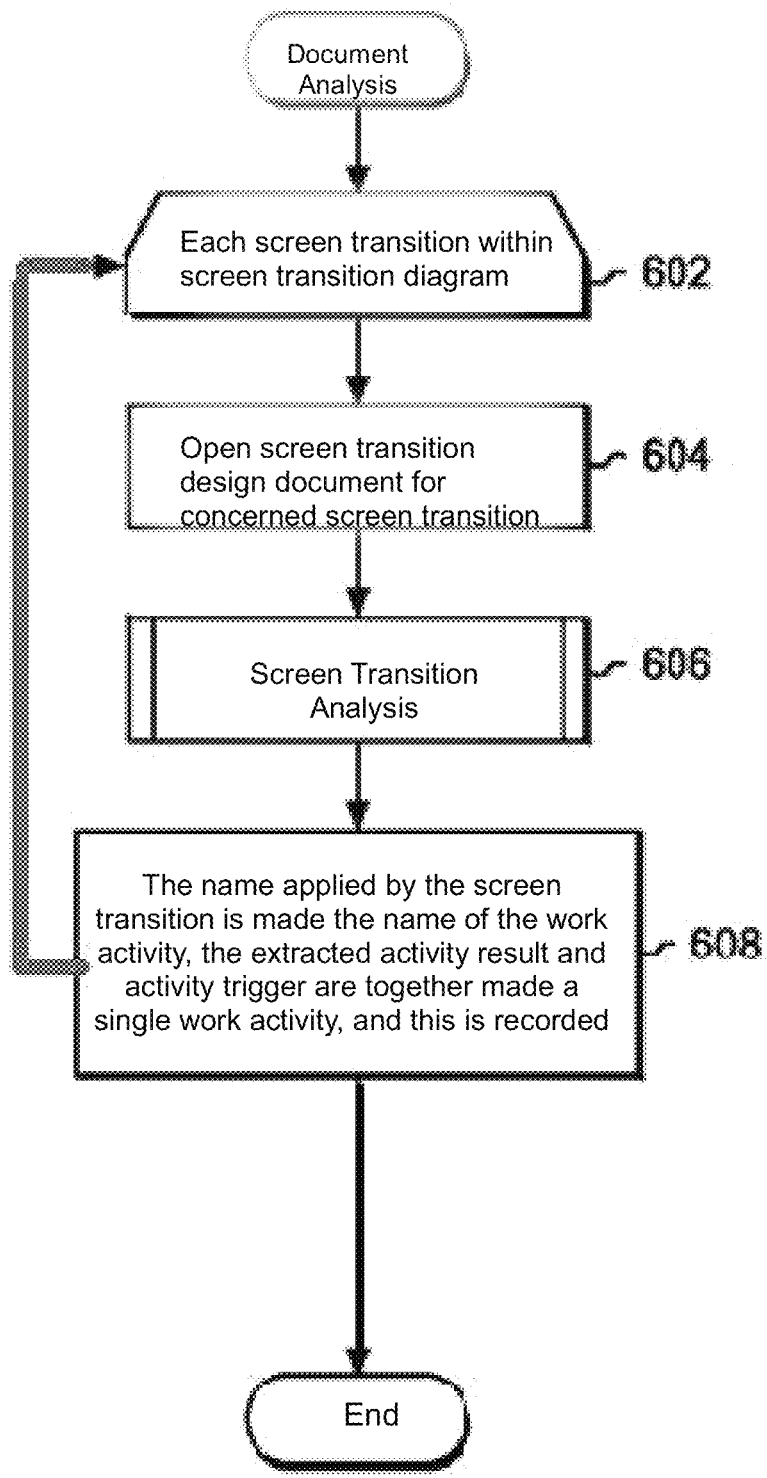
FIG. 6 is a diagram that shows a flow chart of the design document analysis process.

FIG. 6 is a drawing that shows a flow chart of the processing for design document analysis module 222. From Step 602 until Step 610 there is performed processing for each screen transition within screen transition diagram 310.

At Step 604, design document analysis module 222 opens the screen transition design document for the concerned screen transition. At this point, the screen transition design document is a design document that exists in correspondence to each line of screen transition drawing 310, although that is not shown in the drawing.

At Step 606, design document analysis module 222 calls out screen transition analysis module 224. The processing of screen transition analysis module 224 will be explained hereafter by referencing the flow chart of FIG. 7.

At Step 608, design document analysis module 222 sets, for the name of the work activity, the name that has been assigned by the screen transition, and it sets, for the activity trigger and for at least one work activity, the extracted activity result, and it preferably records this data in hard disk drive 108.

Design document analysis module 222 returns from Step 610 to Step 602, and it repeats Steps 602 to 610 until having processed all of the screen transitions within screen transition diagram 310.

Figure 7:
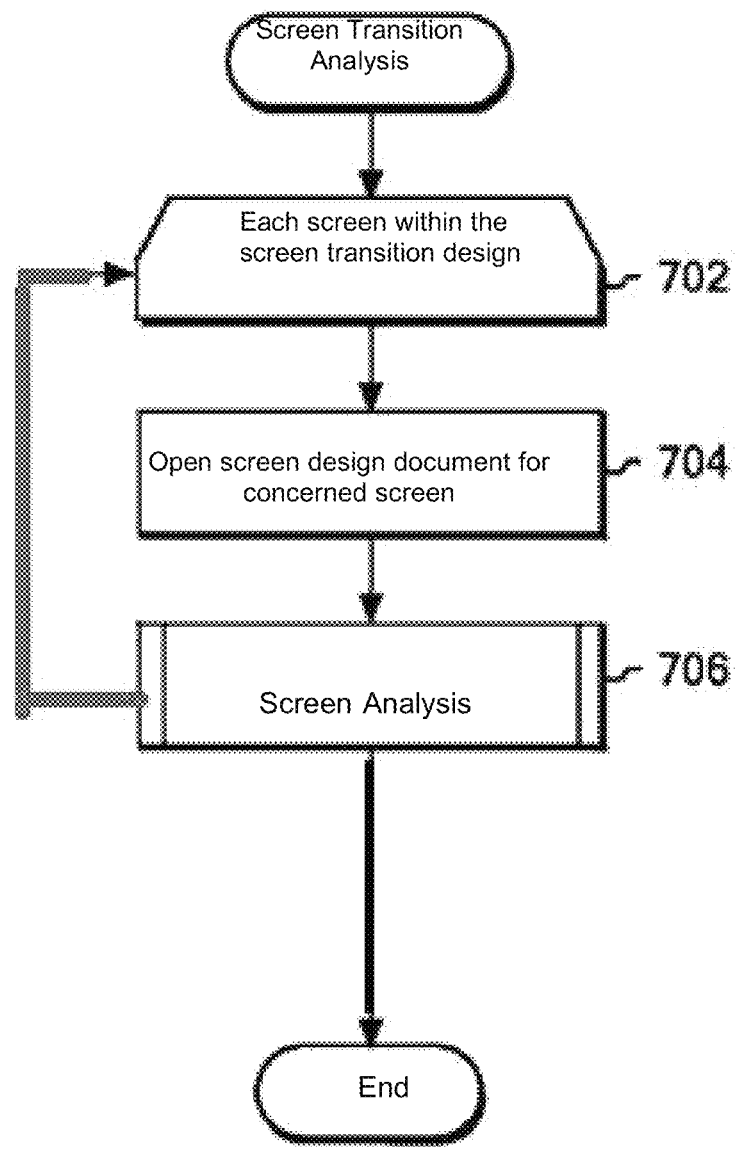
FIG. 7 is a diagram that shows a flow chart of the screen transition analysis process.

The following section describes the processing of screen transition analysis module 224, which is called by Step 606, by referencing the flow chart of FIG. 7.

In FIG. 7, from Step 702 until Step 708, there is performed processing for each screen within the screen transition design.

At Step 704 screen transition analysis module 224 opens the screen design document for the concerned screen. At this point, the screen design document corresponds to a single page of screen design 320.

At Step 706, screen transition analysis module 224 calls out screen analysis module 226. The processing of screen analysis module 226 will be explained hereafter by referencing the flow chart of FIG. 8.

Screen transition analysis module 224 returns from Step 708 to Step 702, and it repeats Steps 702 to Step 708 until having processed all of the screens within the screen transition design.

Figure 8:
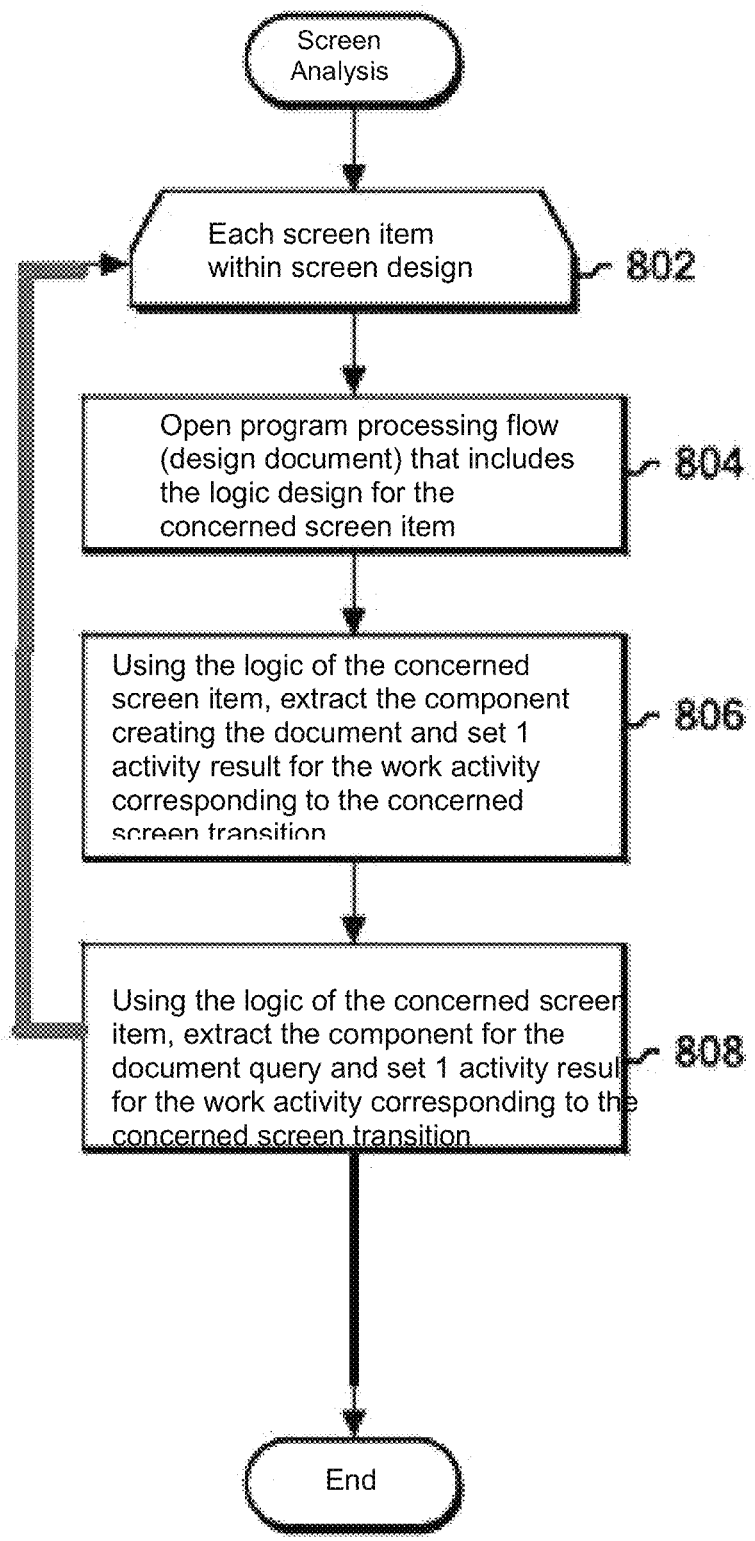
FIG. 8 is a diagram that shows a flow chart of the screen analysis process.

The following section describes the processing of screen analysis module 226, which is called at Step 706, by referencing the flow chart of FIG. 8.

In FIG. 8, from Step 802 until Step 810, there is performed processing for each screen item within the screen design.

At Step 804, screen analysis module 226 opens the program processing flow (design document) that includes the logic design for the concerned screen item.

At Step 806, according to the logic of the concerned screen item, screen analysis module 226 extracts the component creating the document, and it sets that as one activity result for the work activity corresponding to the concerned screen transition. Furthermore, as described hereafter, a description in natural language is placed in the logic of the screen item, and by using this natural language description to search by a regular expression or to extract by a keyword by utilizing such as a text mining, there is enabled judging of which component creating the document. For example, when a document name to be created is understood, by temporarily making that document name to be document 1, there is ability to search for *document 1* using pattern matching with a regular expression. Furthermore, by creating document 1, there is ability to search for *document 1*creation* using pattern matching with a regular expression. Aside from these, there can also be used information such as XML schema.

At Step 808, according to the logic of the concerned screen item, screen analysis module 226 extracts the component for document query and it sets that as one activity trigger for the work activity corresponding to the concerned screen transition. In this situation as well, as at Step 804, there is ability to use methods such as pattern matching by regular expression, text mining, and use of XML schema.

Screen analysis module 226 Screen returns from Step 810 to Step 802, and it repeats Steps 802 to Step 810 until having processed all of the screen items within the screen design.

The following shows examples of the format for output of design document analysis module 222. This output is utilized as input for the processing of the flow charts of FIG. 9~11.

```
<! ELEMENT Activity Result CDATA >
<! ELEMENT Activity Result List (Activity Result) *>
<! ELEMENT Condition CDATA >
<! ELEMENT Activity Trigger (Condition) >
<! ATTLIST Screen ID CDATA >
<! ATTLIST Line CDATA >
<! ELEMENT Activity Trigger List (Activity Trigger) *>
<! ELEMENT Activity (Activity Result List, Activity Trigger List) >
<! ATTLIST Activity Activity Name CDATA >
<! ATTLIST Activity ID CDATA >
<! ELEMENT Activity List (Activity) *>
<! ATTLIST Activity List Category CDATA >
```

Figure 9:
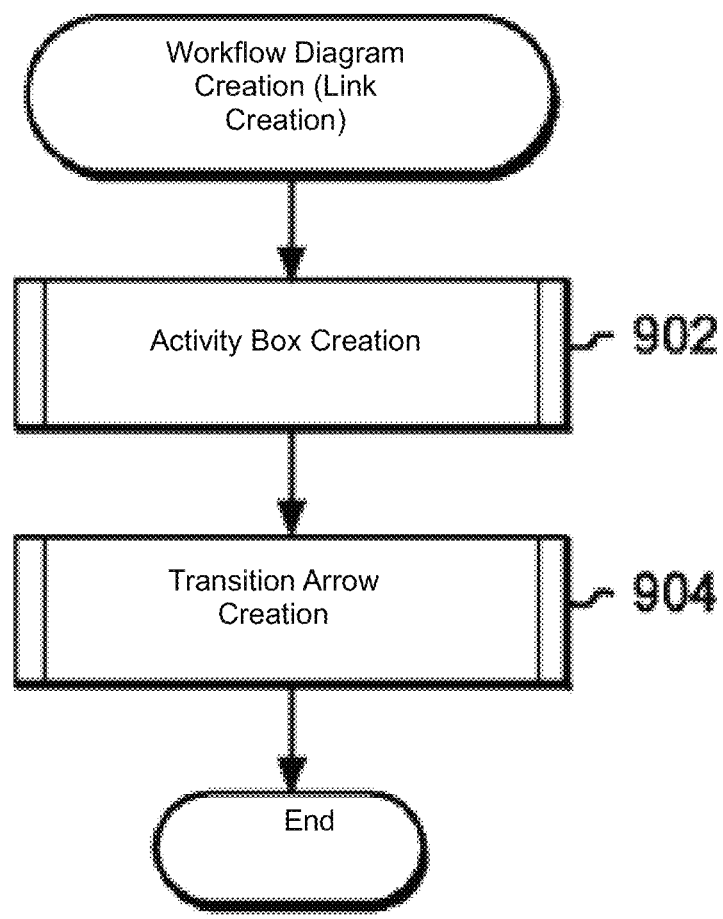
FIG. 9 is a diagram that shows a flow chart of the workflow diagram creation process.

The following section describes the processing of workflow diagram creation module 232, by referencing the flow chart of FIG. 9.

At Step 902, workflow diagram creation module 232 calls activity box creation module 234. The processing of activity box creation module 234 will be explained hereafter by referencing the flow chart of FIG. 10.

Next, at Step 904, workflow diagram creation module 232 calls out transition arrow creation module 236. The processing of transition arrow creation module 236 will be explained hereafter by referencing the flow chart of FIG. 11.

Figure 10:
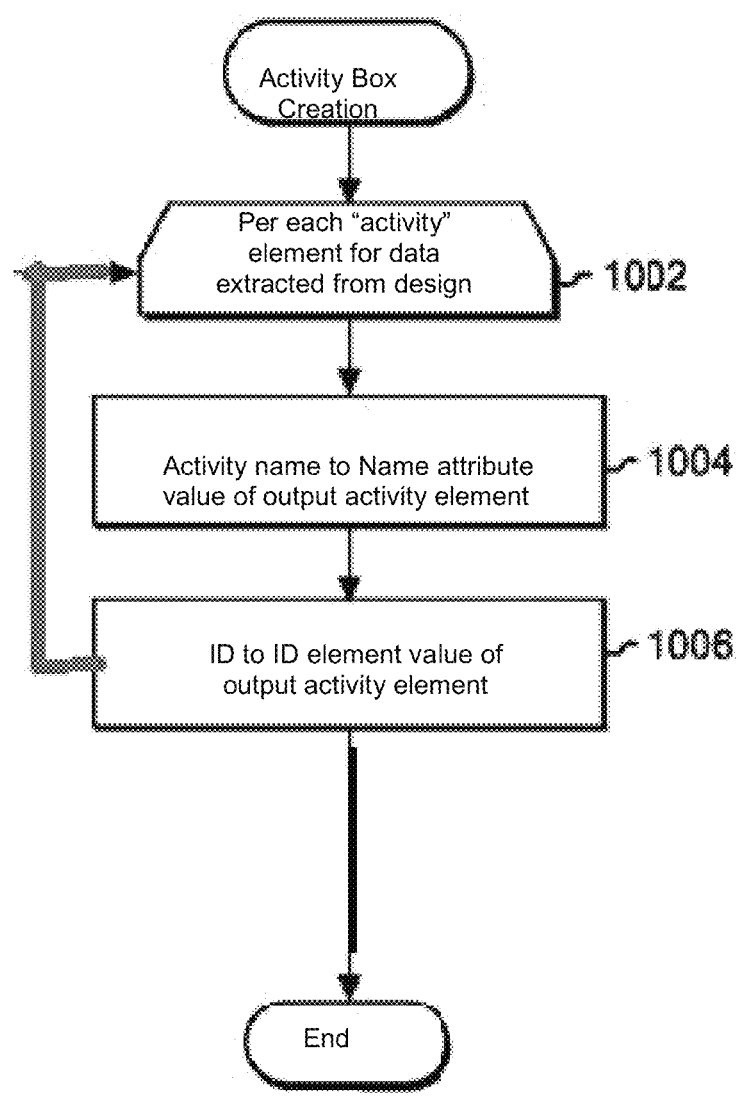
FIG. 10 is a diagram that shows a flow chart of the activity box creation process.

The following section describes the processing of activity box creation module 234, by referencing the flow chart of FIG. 10.

In FIG. 10, from Step 1002 until Step 1008, there is performed processing for each "activity" main element of the data that has been extracted from the design document. At this point, an "activity" element is that which has been recorded as the activity result at Step 608.

At Step 1004, activity box creation module 234 sets the name for the name (name) element of the output activity (activity) element.

Next, at Step 1006, activity box creation module 234 sets the ID of the "activity" element for the ID element value of the output activity element.

Activity box creation module 234 returns from Step 1008 to Step 1002, and it repeats Step 1002 to Step 1008 until having processed all "activity" elements.

Figure 11:
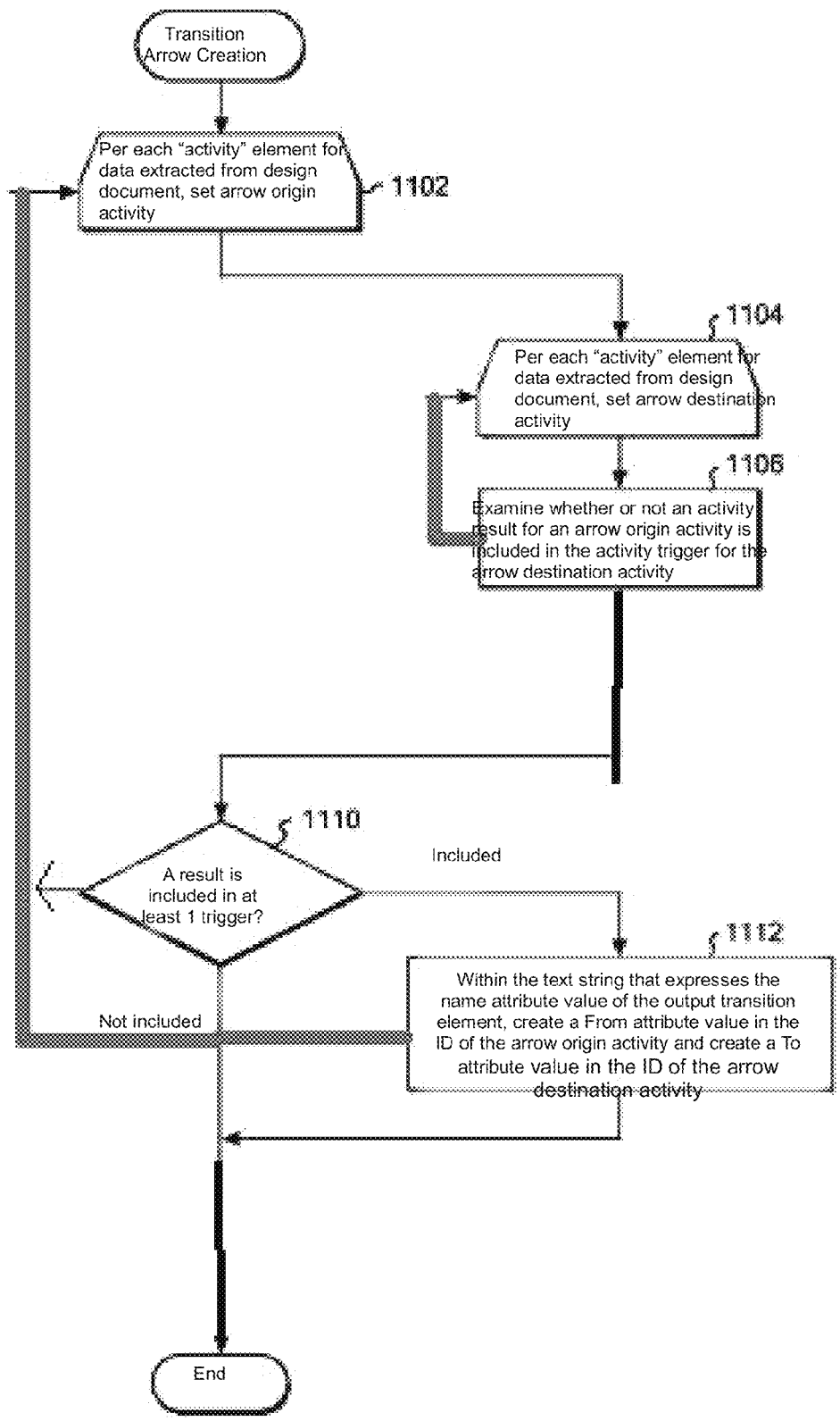
FIG. 11 is a diagram that shows a flow chart of the transition arrow creation process.

The following section describes the processing of transition arrow creation module 236, by referencing the flow chart of FIG. 11.

In FIG. 11, from Step 1102 until Step 1114, there is performed processing with each "activity" element of the data extracted from the design document made the arrow origination.

In addition, from Step 1104 until Step 1108, there is performed processing with each "activity" element of the data extracted from the design document made the arrow destination.

At Step 1106, transition arrow creation module 236 examines whether or not there is included, in the activity trigger for the arrow destination activity, an activity result for the arrow origination activity.

When each "activity" element in all of the extracted data from the design document has been processed as an arrow destination and processing has ended, at Step 1110, transition arrow creation module 236 judges whether or not there is included, in at least one activity trigger for the arrow destination activity, an activity result for the arrow origination activity, and, if that is the case, at Step 1112, it creates, within the text string that expresses the cause and effect relationship for the name attribute value of the output transition (transition) element, a "From" attribute value in the ID of the arrow origination activity and a "To" attribute value in the ID of the arrow destination activity, and it preferably outputs this to hard disk drive 108.

Transition arrow creation module 236 returns from Step 1114 to Step 1102, and it repeats Step 1002 to Step 1114 until having processed all "activity elements as arrow origination activities.

With this embodiment, the output created by transition arrow creation module 236 is an XPDL expression, such as the following.

```
< WorkflowProcess >
.. < Activity ../>
< Transition ../>..
</ WorkflowProcess >
```

Furthermore, for examples of XPDL expressions, there can be referenced http:www.wfmc.org/xpdl.html.

Figure 12:
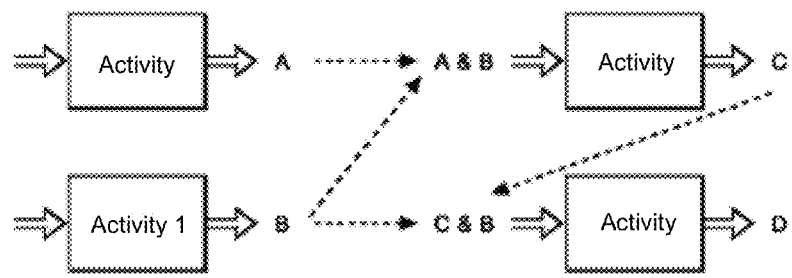
FIG. 12 is a diagram that shows an example of connecting the flow of operations.

FIG. 12 is a diagram that shows the condition of connecting creation of documents as well as queries to documents to the flow of operations. In FIG. 12, the broken line arrows show connected flow.

In order to perform input to visualization tool 240, which is the WebSphere® Business Modeller, transition arrow creation module 236 performs XSLT conversion on the XPDL expression of the result so as to convert to a workflow WBM expression as follows.

```
< process ..>
.. < humanTask ../>
< connection ../>
</ process >
```

For examples of workflow WBM expressions, there can be referenced http:www-06.ibm.com/software/jp/websphere/bpm/modeler/.

Figure 13:
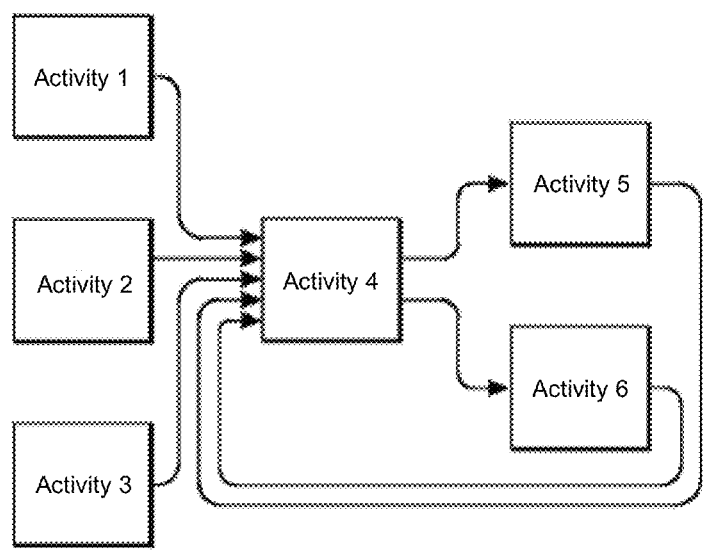
FIG. 13 is a diagram that shows an example of the views of a flow that has been made viewable.

FIG. 13 is a drawing that shows a view, from among the views that have been made viewable by visualization tool 240, that has drilled down to the jobs directly before and directly after a specified activity (at this point, activity 4). This example shows that the activities at the origins of the arrows have become triggers for the activities at the destinations of the arrows. For example, the activity result of activity 1 is the becoming of a trigger for the activity of activity 4.

By observing such a view, the user is able to verify the suitability of the specification.

This invention has been described above by following a specified embodiment, but this invention is not limited to a specific operating system or platform, and it can be discretionarily implemented on another computer system.

The invention claimed is:

1. A method for creating a graph of a workflow diagram, wherein the workflow diagram spans from a plurality of design drawings of a plurality of work activity support systems to a plurality of corresponding work activities, for designing a plurality of reciprocally independent work items, by using a software architecture on a computer, the method comprising:
   preparing, in a computer readable format, a design document for processing, wherein the design document includes a program processing flow describing a plurality of screen transition tables, each screen item of a screen design, and a related logic design;
   reading, by a computer processor, the program processing flow, which includes a description that specifies a screen item and a reference logic identifier, for each screen item specified by a screen transition;
   extracting, by the related logic design of the screen item, a component constituting the design document, and recording the component that constitutes the design document, wherein the design document is an activity result for an activity that corresponds to a screen transition related to the screen item;
   extracting, by the related logic design of the screen item, the component for a document query, and recording the component for a document query as an activity trigger for an activity that corresponds to a screen transition related to the screen item, wherein the component includes a document state that becomes the activity trigger for the activity that corresponds to the screen transition related to the screen item; and
   creating, by a computer processor, the graph of the workflow diagram, wherein the activity is a node, the activity result is a link origin, and the activity trigger is a link terminus.

2. The method according to claim 1, wherein:
   the related logic design of the screen item describes a specification that is recorded in a natural language; and
   the processing that extracts the component constituting the design document and the processing that extracts the component for the document query are both executed by a keyword search using a regular expression.

3. The method according to claim 1, wherein the program processing flow describing the plurality of screen transition tables, each screen item of the screen design, and the related logic design, is recorded by a spreadsheet program.

4. The method according to claim 1, wherein the activity result and the activity trigger are both recorded by XML.

5. A computer readable non-transitory article of manufacture tangibly embodying computer readable instructions which, when executed, cause a computer to carry out the steps of a method for creating a graph of a workflow diagram, wherein the workflow diagram spans from a plurality of design drawings of work activity support systems to a plurality of corresponding work activities, for designing a plurality of reciprocally independent work items, the method comprising:
   preparing, in a computer readable format, a design document for processing, wherein the design document includes a program processing flow describing a plurality of screen transition tables, each screen item of a screen design, and a related logic design;
   reading, by a computer processor, the program processing flow, which includes a description that specifies a screen item and a reference logic identifier, for each screen item specified by a screen transition;
   extracting by the related logic design of the screen item, a component constituting the design document, and recording the component constituting the design document, wherein the design document is as activity result for an activity that corresponds to a screen transition related to the screen item;
   extracting by the related logic design of the screen item, the component for a document query, and recording the component for the document query as an activity trigger for an activity that corresponds to a screen transition related to a screen item, wherein the component includes a document state that becomes the activity trigger for the activity that corresponds to the screen transition related to the screen item; and
   creating by a computer processor a graph of the workflow, which includes the activity as a node, the activity result as a link origin and the activity trigger as a link terminus.

6. The computer according to claim 5, wherein:
   the logic design of the screen item describes a specification that is recorded in natural language; and
   the processing that extracts the component constituting the design document and the processing that extracts the component for a document query are both executed by a keyword search using a regular expression.

7. The computer according to claim 5, wherein the program processing flow describing the plurality of screen transition tables, each screen item of the screen design, and the related logic design, is recorded by a spreadsheet program.

8. The computer according to claim 5, wherein the activity result and the activity trigger are recorded by XML.

9. A computer implemented system for creating a graph of a workflow diagram, wherein the workflow diagram spans from a plurality of design drawings of work activity support systems to a plurality of corresponding work activities, for designing a plurality of reciprocally independent work items by using a software architecture on a computer, the computer implemented system comprising:
   a memory;
   a processor device communicatively coupled to the memory; and
   a logic structure communicatively coupled to the memory and the processor device, wherein the logic structure is configured to perform the steps of a method comprising:
   reading data from a design document, wherein the design document comprises a program processing flow describing a plurality of screen transition tables, each screen item of the screen design, and a related logic design which has been recorded in a computer readable format;

reading the program processing flow, which includes a description that specifies a screen item and a reference logic identifier, for each screen item specified by a screen transition;

extracting, by the related logic design of the screen item, a component constituting the document, and recording the component constituting the design document, wherein the design document is an activity result for an activity that corresponds to a screen transition related to the screen item;

extracting, by the logic design of the screen item, the component for a document query and recording the component as an activity trigger for an activity that corresponds to a screen transition related to the screen item, wherein the component includes a document state that becomes the activity trigger for the activity that corresponds to the screen transition related to the screen item; and creating a graph of the workflow, with the activity as a node, the activity result as a link origin, and the activity trigger as a link terminus.

10. The system according to claim 9, wherein:

the related logic design of the screen item describes a specification that is recorded in a natural language; and the processing that extracts the component constituting the document and the processing that extracts the component for the design document query are both executed by a keyword search using a regular expression.

11. The system according to claim 9, wherein the program processing flow describing the plurality of screen transition tables, each screen item of the screen design, and the related logic design, is recorded by a spreadsheet program.

12. The system according to claim 9, wherein the activity result and the activity trigger are both recorded by XML.

13. The method according to claim 1, wherein creating the workflow diagram comprises:

determining whether an activity result for an arrow origination activity is included in at least one activity trigger for an arrow destination activity; and responsive to determining the activity result for an arrow origination activity is included in at least one activity trigger for an arrow destination activity, creating, within a text string that expresses the cause and effect relationship for the name attribute value of the output transition element, a from attribute value in the ID of the arrow of the origination activity and a to attribute value in the ID of the arrow destination activity.

14. The computer according to claim 5, wherein creating the workflow diagram comprises:

determining whether an activity result for an arrow origination activity is included in at least one activity trigger for an arrow destination activity; and responsive to determining the activity result for an arrow origination activity is included in at least one activity trigger for an arrow destination activity, creating, within a text string that expresses the cause and effect relationship for the name attribute value of the output transition element, a from attribute value in the ID of the arrow of the origination activity and a to attribute value in the ID of the arrow destination activity.

15. The system according to claim 9, wherein creating the workflow diagram comprises:

determining whether an activity result for an arrow origination activity is included in at least one activity trigger for an arrow destination activity; and responsive to determining the activity result for an arrow origination activity is included in at least one activity trigger for an arrow destination activity, creating, within a text string that expresses the cause and effect relationship for the name attribute value of the output transition element, a from attribute value in the ID of the arrow of the origination activity and a to attribute value in the ID of the arrow destination activity.

\* \* \* \* \*